(12) United States Patent
D'Penha et al.

(10) Patent No.: US 12,499,331 B2
(45) Date of Patent: Dec. 16, 2025

(54) COMPUTER-IMPLEMENTED METHOD FOR CONNECTING A USER TO A MOBILE TELEPHONE-BASED LANGUAGE INTERPRETATION SESSION

(71) Applicant: Language Line Services, Inc., Monterey, CA (US)

(72) Inventors: Lindsay D'Penha, Carmel, CA (US); Jeffrey Cordell, Carmel, CA (US); James Boutcher, Carmel, CA (US)

(73) Assignee: Language Line Services, Inc., Monterey, CA (US)

( * ) Notice: Subject to any disclaimer, the term of this patent is extended or adjusted under 35 U.S.C. 154(b) by 315 days.

(21) Appl. No.: 17/886,779

(22) Filed: Aug. 12, 2022

(65) Prior Publication Data

US 2024/0054299 A1 Feb. 15, 2024

(51) Int. Cl.
G06Q 10/00 (2023.01)
G06F 40/58 (2020.01)
H04M 3/51 (2006.01)

(52) U.S. Cl.
CPC .............. *G06F 40/58* (2020.01); *H04M 3/51* (2013.01); *H04M 2203/2061* (2013.01)

(58) Field of Classification Search
None
See application file for complete search history.

(56) References Cited

U.S. PATENT DOCUMENTS

| | | | | |
|---|---|---|---|---|
| 2004/0196867 A1* | 10/2004 | Ejzak | ....................... | H04M 3/56 709/227 |
| 2005/0266387 A1* | 12/2005 | Rossides | .................. | G09B 7/00 434/323 |
| 2007/0064916 A1* | 3/2007 | Moore, Jr. | .............. | H04M 3/42 379/265.12 |
| 2014/0046777 A1* | 2/2014 | Markey | .................. | G06Q 30/02 705/14.66 |

(Continued)

OTHER PUBLICATIONS

Yabe, Manako, Healthcare providers' and deaf patients' interpreting preferences for critical care and non-critical care: Video remote interpreting, 2020, Disability and Health Journal, https://www.sciencedirect.com/science/article/pii/S1936657419301888, p. 1-8. (Year: 2020).*

*Primary Examiner* — Joseph M Waesco
(74) *Attorney, Agent, or Firm* — Ryan T. Grace; Advent, LLP

(57) ABSTRACT

A computer-implemented process receives, at a language interpretation platform from a customer service agent computing device, a request to establish a language interpretation session with a user. In addition, the computer-implemented process places a call from the language interpretation platform to a user mobile computing device. The computer-implemented process, upon the user not answering the call, automatically transmits a message to the user mobile computing device indicating one or more language interpretation connection options. Additionally, the computer-implemented process establishes, via the language interpretation platform, a language interpretation session (Continued)

between the customer service agent computing device, a language interpreter computing device, and the user mobile computing device based on the one or more language interpretation options.

12 Claims, 6 Drawing Sheets

(56) References Cited

U.S. PATENT DOCUMENTS

| | | | |
|---|---|---|---|
| 2016/0277587 A1* | 9/2016 | Alexander | H04M 3/46 |
| 2016/0299887 A1* | 10/2016 | Cordell | G06Q 10/06 |
| 2019/0043484 A1* | 2/2019 | Yeracaris | G10L 15/063 |
| 2019/0158668 A1* | 5/2019 | Boone | H04M 3/5231 |
| 2020/0193980 A1* | 6/2020 | Cordell | G06F 40/40 |
| 2022/0253291 A1* | 8/2022 | Statham | H04M 3/5235 |
| 2022/0256248 A1* | 8/2022 | Shao | H04N 21/439 |
| 2024/0232680 A9* | 7/2024 | Betteridge | G06N 20/00 |

* cited by examiner

COMPUTER-IMPLEMENTED METHOD FOR CONNECTING A USER TO A MOBILE TELEPHONE-BASED LANGUAGE INTERPRETATION SESSION

BACKGROUND

1. Field

This disclosure generally relates to the field of language interpretation. More particularly, the disclosure relates to computer-implemented processes for connecting users to telephone-based language interpretation sessions.

2. General Background

Over-the-phone interpretation is a process wherein users may receive language interpretation via a language interpretation session performed over a telephone system. (The term "language" referred to herein is the method of voice-based communication traditionally used by a group of people originating from a particular geographical location, country, or region, but may also include non-voice-based communication such as sign language or Braille.) A customer service agent of a service provider (e.g., healthcare provider, insurance provider, etc.) may call into a language interpretation platform to seek language interpretation assistance for the purpose of calling and speaking with a client of the customer service agent, who may be a limited English proficiency speaker ("LEP").

Typically, during these requests the LEP is not present on the call. In other words, the customer service agent calls a language interpretation provider, who then attempts to reach the LEP. Given the heightened sense of privacy awareness in recent times resulting from the prevalence of spam and robocalls, more than half the time LEPs typically will not answer these unrecognized (via caller id) phone calls on their mobile devices. In fact, many LEPs will impose a spam block on their phones to prevent unrecognized calls from being heard.

As a result, current language interpretation platforms are operating in an inefficient manner: utilizing computing resources for a majority of phone calls that will be unanswered rather than allocating those resources for improving the processing time of those that will be answered.

SUMMARY

In one embodiment, a computer-implemented process receives, at a language interpretation platform from a customer service agent computing device, a request to establish a language interpretation session with a user. In addition, the computer-implemented process places a call from the language interpretation platform to a user mobile computing device. The computer-implemented process, upon the user not answering the call, automatically transmits a message to the user mobile computing device indicating one or more language interpretation connection options. Additionally, the computer-implemented process establishes, via the language interpretation platform, a language interpretation session between the customer service agent computing device, a language interpreter computing device, and the user mobile computing device based on the one or more language interpretation options.

Alternatively, a computer program product may have a computer readable storage device with a computer readable program stored thereon that implements the functionality of the aforementioned processes. As yet another alternative, a system may implement the processes via various componentry.

BRIEF DESCRIPTION OF THE DRAWINGS

The above-mentioned features of the present disclosure will become more apparent with reference to the following description taken in conjunction with the accompanying drawings wherein like reference numerals denote like elements and in which.

DETAILED DESCRIPTION

A computer-implemented method for connecting a user, such as an LEP, to a mobile telephone-based language interpretation session is provided. (The term telephone is intended herein to refer to mobile devices with telephony features. Audio and/or audio features may be utilized during the telephone call.) The answer rate for telephone calls is increased as a result of the LEP being able to recognize the origin of the telephone call.

Figure 1A:
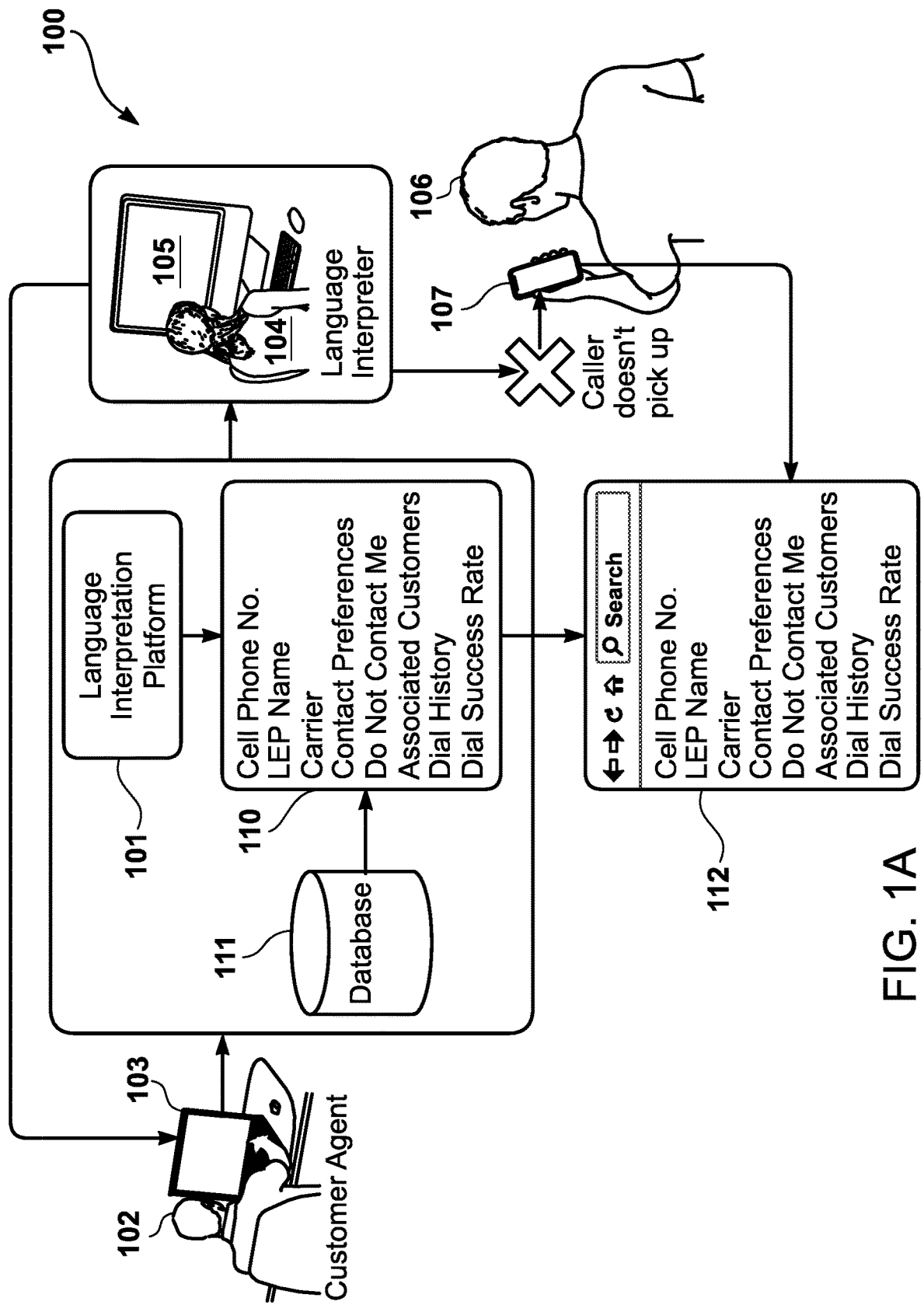
FIG. 1A illustrates a language interpretation configuration in which a language interpretation platform is utilized to establish a language interpretation session.

FIG. 1A illustrates a language interpretation configuration 100 in which a language interpretation platform 101 is utilized to establish a language interpretation session. In particular, a customer service agent 102 utilizing a customer service computing device 103, which has telephony components, places a call to the language interpretation platform 101, which connects the call to a language interpretation computing device 105, which also has telephony components, operated by a language interpreter 104. In one embodiment, the call is placed by the language interpreter 104 without an LEP 106 present on the line. As an example, a healthcare provider may be placing a follow up call regarding a medical office visit and may have a notation that language interpretation will be needed for a conversation with the LEP 106. Accordingly, the language interpreter 104 attempts to place a call to the LEP 106, which is unanswered. As a result of the unanswered call, the language interpretation platform 101 sends a message (e.g., text message, email, etc.) to the mobile device 107 of the LEP 106 informing the LEP 106 the purpose of the call, the name of the language interpreter platform's customer (e.g., the healthcare provider), and/or a menu of options for allowing the language interpretation platform 101 to facilitate a callback.

Figure 1B:
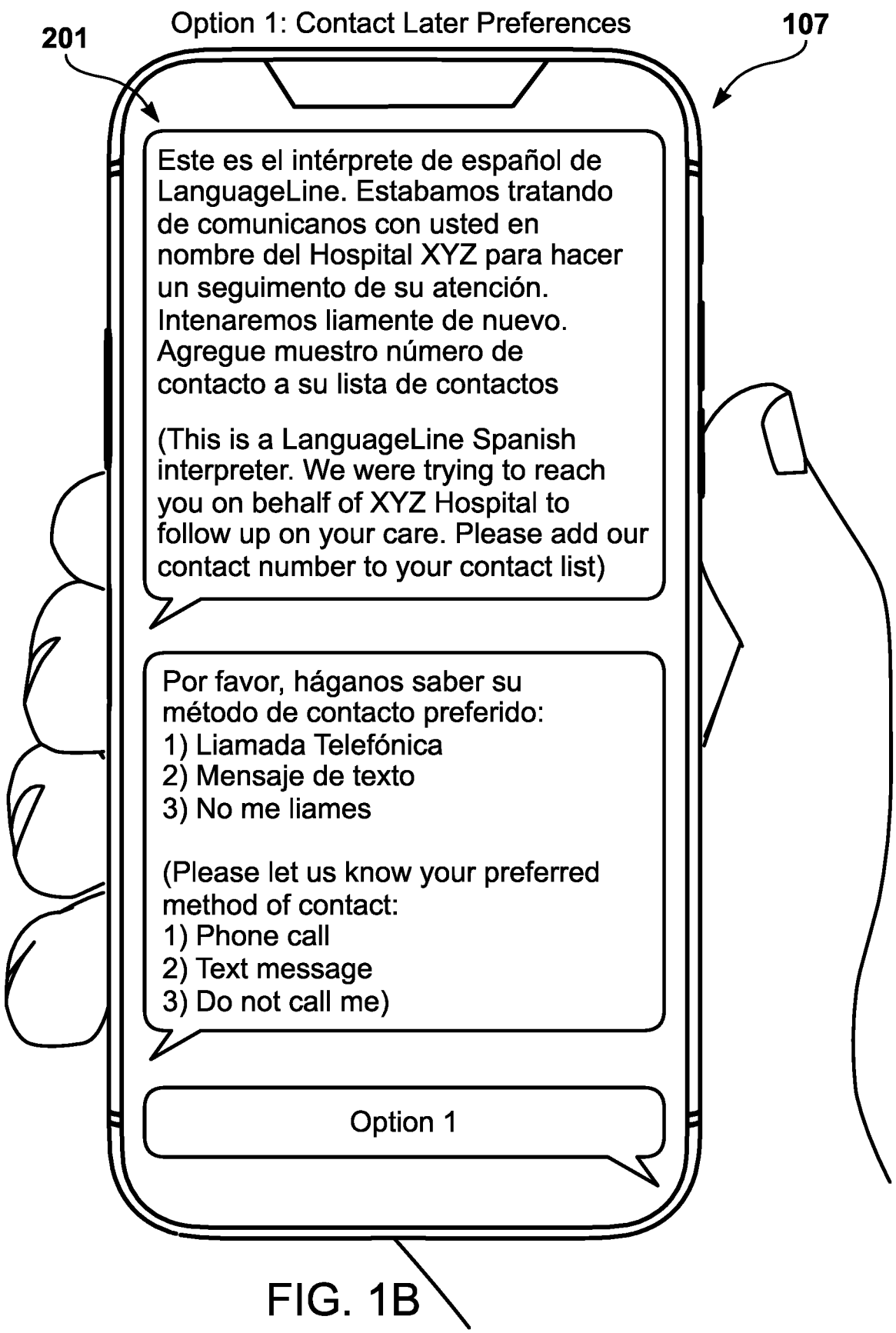
FIG. 1B illustrates an example of the mobile device of the LEP rendering a user interface.

FIG. 1B illustrates an example of the mobile device 107 of the LEP 106 rendering a user interface 201. In particular, the user interface 201 announces who the interpreter is and that the interpreter has being trying to reach the LEP 106. Additionally, the user interface 201 requests that the LEP 106 add the language interpretation provider to the contact list of the LEP 106 in the mobile device 107. In essence a "vcard" is generated. Furthermore, the user interface 201 may request the preferred method of contact (e.g., phone call, text message, or no contact at all).

Turning back to FIG. 1A, the contact preferences (e.g., mobile device number, LEP name, mobile device carrier, dial success rate, do not contact flag, etc.) may be inputted by the LEP 106 via a contact preferences interface 112, via the user mobile device 107, and transmitted from the user mobile device 107 of the LEP 106 to the language interpretation platform 101, which then stores that data in an outbound calling data structure 110. The outbound calling data structure 110, which may be an array, linked list, etc., is optimized to improved computing efficiency by being used by the language interpretation platform 101 for future calls to the LEP 106. In other words, the outbound calling data structure 110 interjects data into data flow for an outbound call prior to the call being placed so that an LEP 106 is contacted according to contact preferences, thereby minimizing the possibility of wasted computing resources allocated for a telephone call that is not placed according to such preferences. As a result, the use of the outbound calling data structure 110 not only increases the answer rate but also improves the computing efficiency of the language interpretation platform 101 by making more effective usage of network bandwidth. (A computerized network is used to communicate between the various mobile devices described herein and the language interpretation platform 101.) In one embodiment, the outbound calling data structure 110 may be stored in a database 111 that is accessed by the language interpretation platform 101 prior to placing a future call to the LEP 106.

Additionally, or alternatively, the database 110 may be utilized to store statistical data that is used to develop a probabilistic model that establishes the likelihood of the LEP 106 answering a telephone call. For example, historical information pertaining to the LEP's answer history may be utilized to predict answer rates by time of day. In one embodiment, the user interface 201 provides options based upon the probabilistic model. For example, if the LEP 106 is more likely to answer at a particular time of day, a callback option is provided.

Figure 2A:
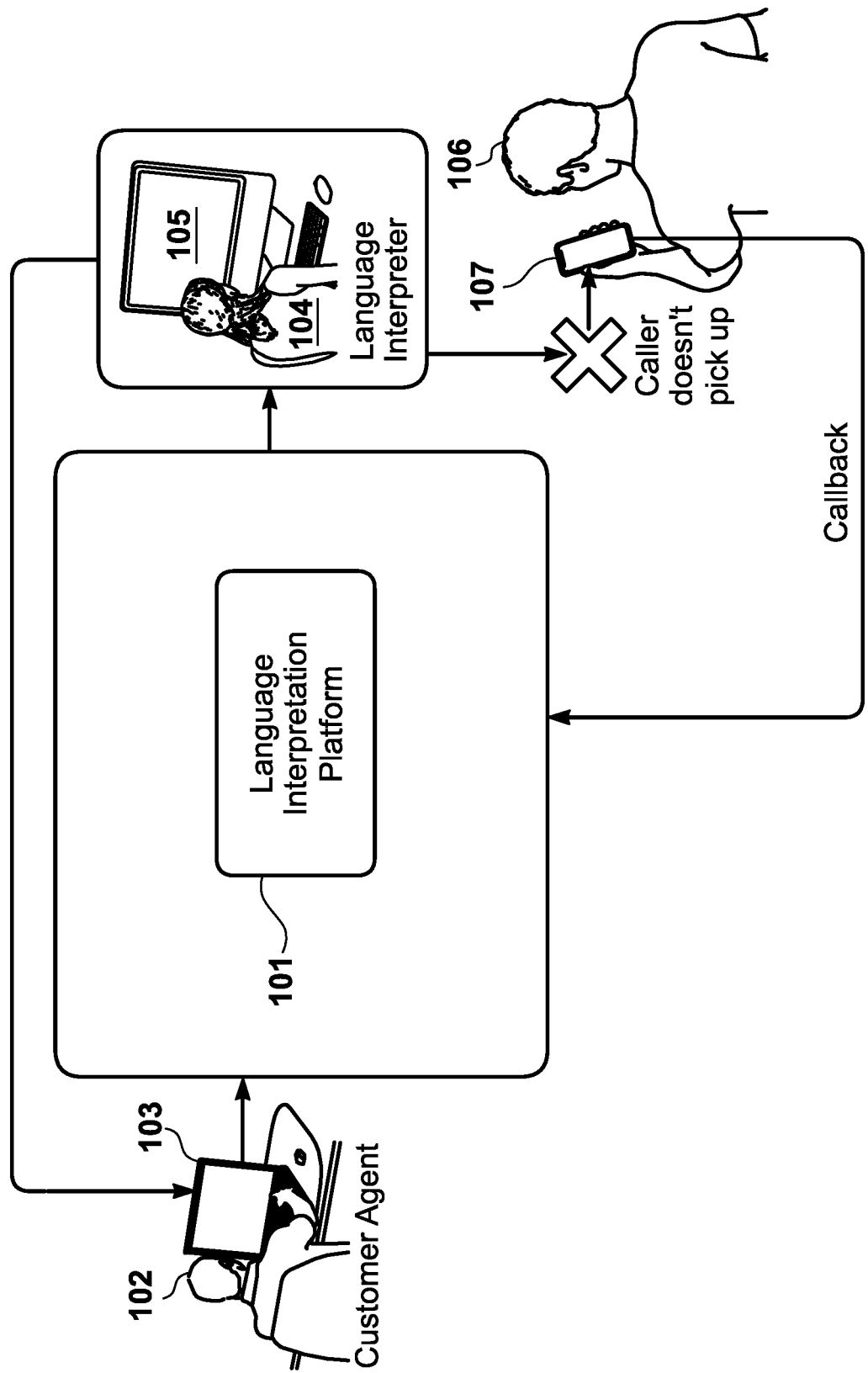
FIG. 2A illustrates the language interpretation configuration being implemented without the outbound calling data structure and the database.
Figure 2B:
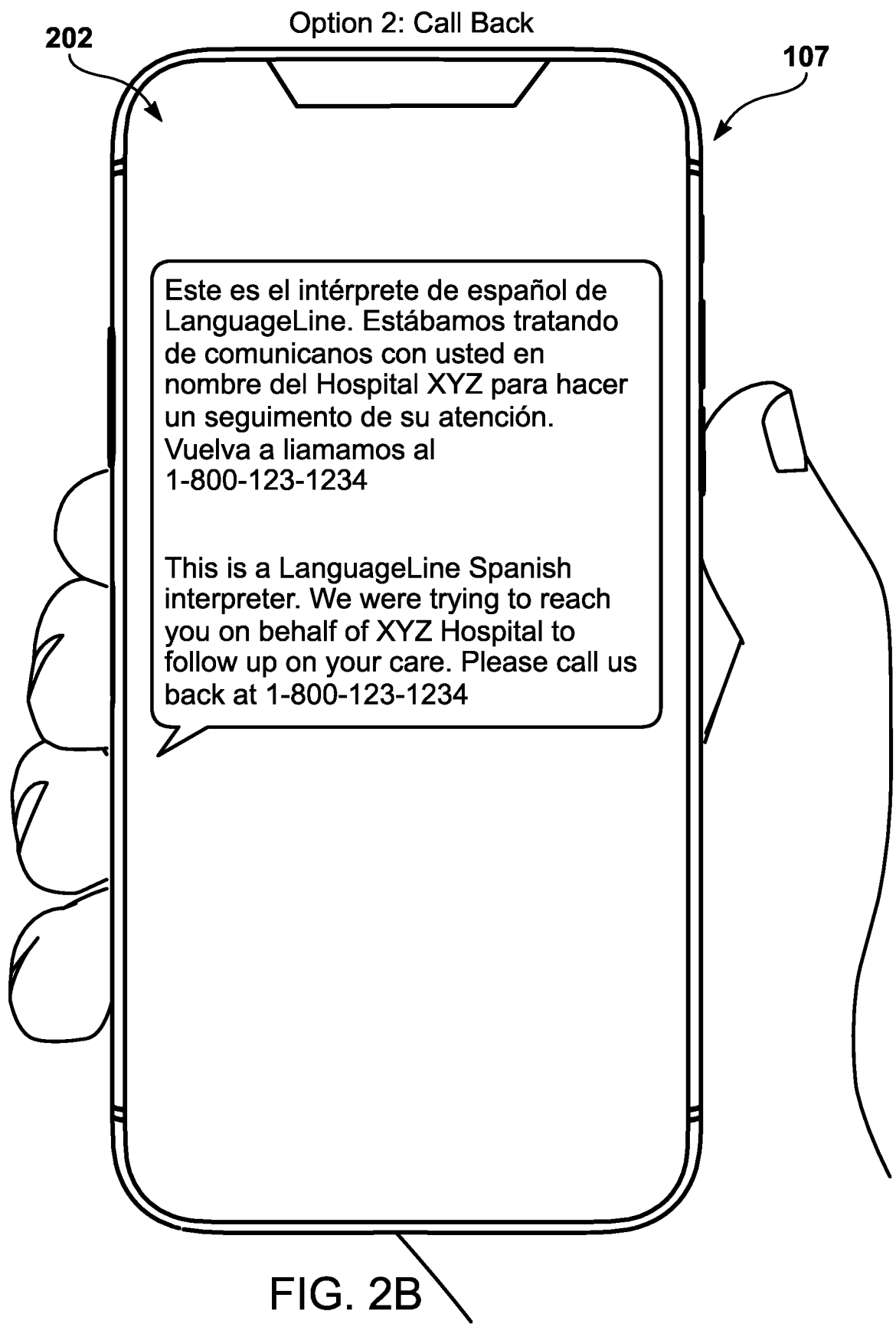
FIG. 2B illustrates a user interface that illustrates the callback option.

In an alternative embodiment, the language interpretation configuration 100, may be implemented without the outbound calling data structure 110 and the database 111, as illustrated in FIG. 2A. For instance, the LEP 106 may be notified that a particular customer was trying to reach them and that a callback can be made at a particular telephone number. FIG. 2B illustrates a user interface 202 that illustrates the callback option. A telephone number at which the language interpretation provider may be reached is provided. In one embodiment, the LEP 106 may callback the language interpretation service while the customer is on the line. In another embodiment, the LEP 106 performs the callback, and an automated system answers the call. The LEP 106 is then prompted in the language of the LEP 106. The language interpreter 105, who was previously part of the language interpreter session, and the customer service agent 102, who was previously part of the language interpreter session, are then connected to the LEP 106.

In yet another alternative embodiment, the customer may perform a dial-out campaign or an in-language text campaign to all the LEPs 106 that been associated with the customer throughout the history with the customer. Alternatively, a list of LEP numbers may be provided by the customer. The dial-out campaign allows the customer to reach LEP populations with a targeted message that allows the LEP to call back the language interpretation provider.

Figure 3:
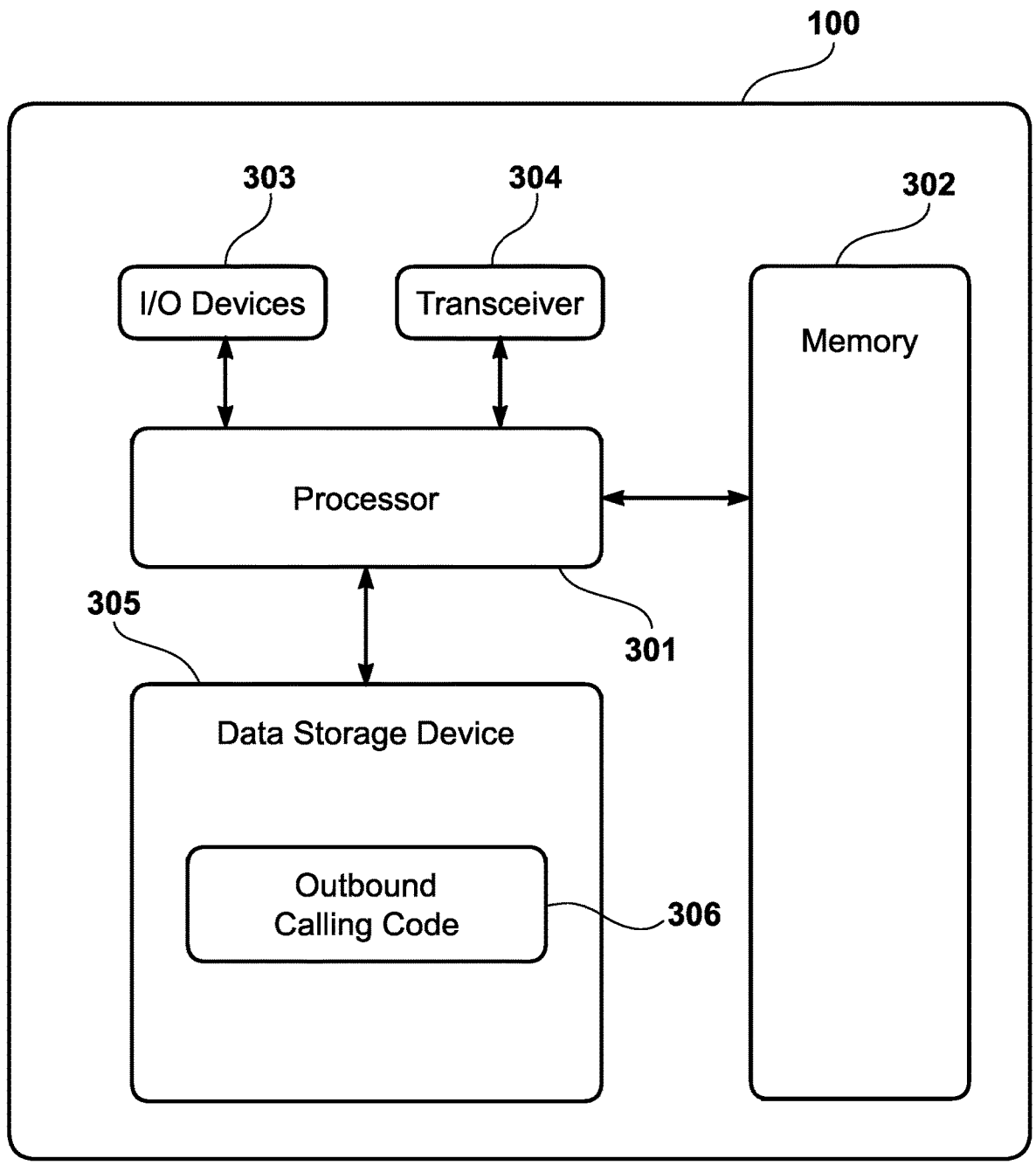
FIG. 3 illustrates a system configuration for the language interpretation configuration illustrated in FIG. 1.

FIG. 3 illustrates a system configuration for language interpretation configuration 100 illustrated in FIG. 1. A processor 301 may be specialized for outbound calling operations. The system configuration 300 may also include a memory device 302, which may temporarily store the outbound calling data structure 110. Furthermore, the memory device 302 may temporarily store computer readable instructions performed by the processor 301. As an example of such computer readable instructions, a data storage device 305 within the system configuration may store outbound calling code 306 that may be utilized to compose, maintain, and access the outbound calling data structure 110. Various devices (e.g., keyboard, microphone, mouse, pointing device, hand controller, joystick, display screen, holographic projector, etc.) may be utilized for input/output ("I/O") devices 303. The system configuration may also have a transceiver 304 to send and receive data. Alternatively, a separate transmitter and receiver may be used instead.

Figure 4:
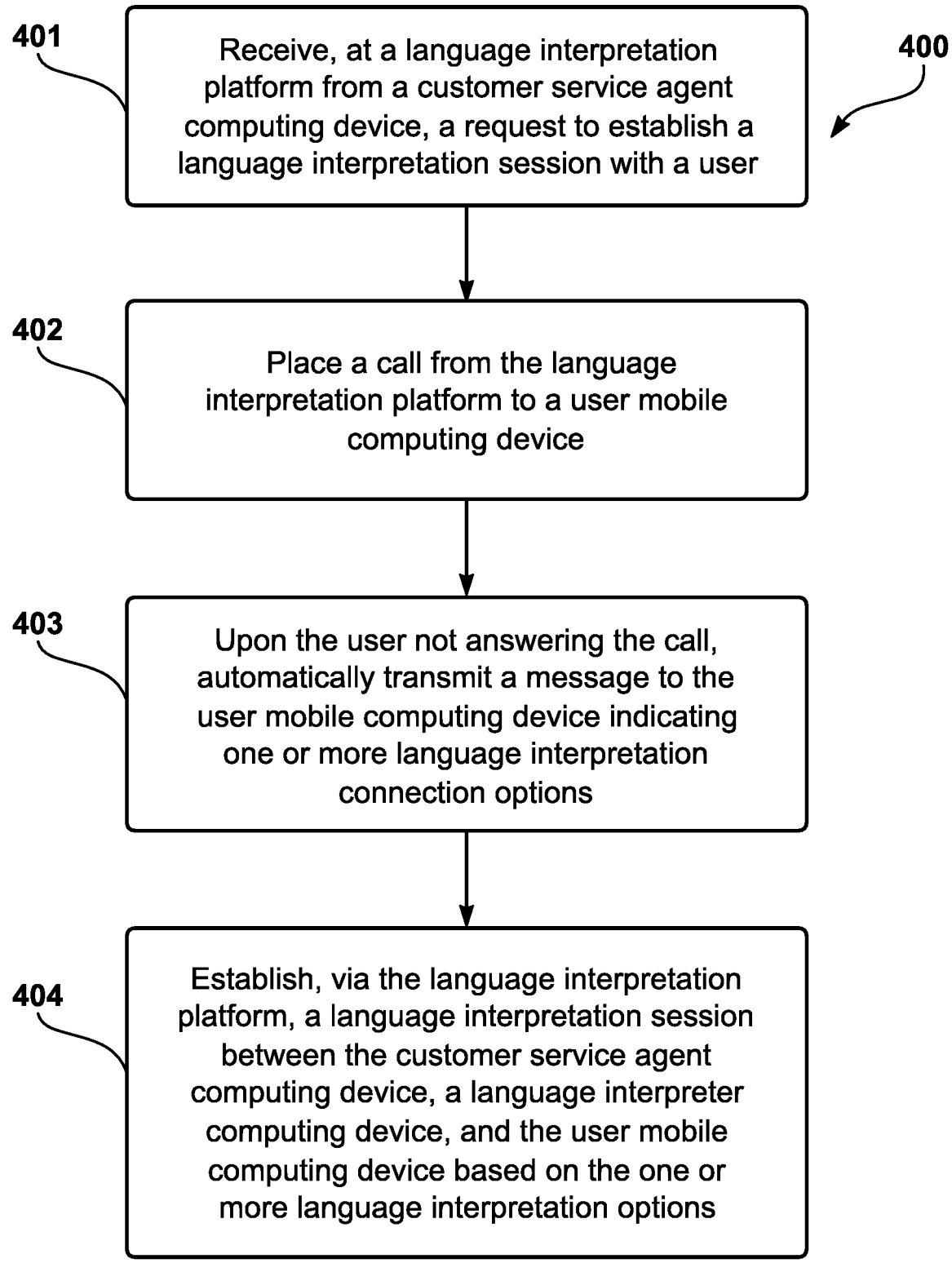
FIG. 4 illustrates a computer-implemented process for connecting a user, such as an LEP, to a mobile telephone-based language interpretation session.

FIG. 4 illustrates a computer-implemented process 400 for connecting a user, such as an LEP, to a mobile telephone-based language interpretation session. At a process block 401, the computer-implemented process 400 receives, at a language interpretation platform 101 from a customer service agent computing device 103, a request to establish a language interpretation session with a user 102. In addition, at a process block 402, the computer-implemented process 400 places a call from the language interpretation platform to a user mobile computing device. At a process block 403, the computer-implemented process 400, upon the user not answering the call, automatically transmits a message to the user mobile computing device indicating one or more language interpretation connection options. Furthermore, at a process block 404, the computer-implemented process 400 establishes, via the language interpretation platform, a language interpretation session between the customer service agent computing device 103, a language interpreter computing device 105, and the user mobile computing device 107 based on the one or more language interpretation options.

It is understood that the apparatuses, systems, computer program products, and processes described herein may also be applied in other types of apparatuses, systems, computer program products, and processes. Those skilled in the art will appreciate that the various adaptations and modifications of the embodiments of the apparatuses, systems, computer program products, and processes described herein may be configured without departing from the scope and spirit of the present apparatuses, systems, computer program products, and processes. Therefore, it is to be understood that, within the scope of the appended claims, the present apparatuses, systems, computer program products, and processes may be practiced other than as specifically described herein.

We claim:

1. A computer-implemented process comprising:
   receiving, at a language interpretation platform from a customer service agent computing device, a request to establish a language interpretation session with a user;
   placing a call from the language interpretation platform to a user mobile computing device;
   upon the user not answering the call, automatically transmitting a message, via the language interpretation platform, to the user mobile computing device indicating one or more language interpretation connection options;
   establishing, via the language interpretation platform, a language interpretation session between the customer service agent computing device, a language interpreter computing device, and the user mobile computing device based on a selection by the user of the one or more language interpretation options;

storing data corresponding to the one or more language interpretation options in an outbound calling data structure that automatically interjects data, prior to completion of the establishment of the language interpretation session, into a data flow of a communication that performs the establishment of the language interpretation session;

storing the outbound calling data structure in a database;

generating a probabilistic model based on statistical data stored in the database, the probabilistic model establishing a probability of the user answering the call;

accessing, via the language interpretation platform, the outbound calling data structure ad the probabilistic model;

establishing, via the language interpretation platform, a second language interpretation session with the user mobile computing device responsive to the accessed outbound calling data structure stored in the database and the probabilistic model; and updating the statistical data stored in the database with an answer history of the user based on an outcome of the second language interpretation session to develop the probabilistic model, the outcome including whether the user answered a call associated with the second language interpretation session.

2. The computer-implemented process of claim 1, wherein the one or more language interpretation options comprise automatically adding contact information for the language interpretation platform to the user mobile computing device.

3. The computer-implemented process of claim 1, wherein the one or more language interpretation options comprise data indicating a purpose of the call and a name of a customer associated with the customer service agent.

4. The computer-implemented process of claim 1, wherein the language interpretation session is established by having the customer service agent and the language interpreter wait for the user to join the call within a predetermined time period.

5. The computer-implemented process of claim 1, wherein the language interpretation session is established by having the customer service agent and the language interpreter initiate a new call after the call is initiated by the user.

6. The computer-implemented process of claim 1, wherein the answer history of the user includes a dial success status and a time of establishing the second language interpretation session, and wherein the probabilistic model establishes a probability of the user answering a call by time of day.

7. A computer program product comprising a non-transitory computer readable storage device having a computer readable program stored thereon, wherein the computer readable program when executed on a computer causes the computer to:

receive, at a language interpretation platform from a customer service agent computing device, a request to establish a language interpretation session with a user;

place a call from the language interpretation platform to a user mobile computing device;

upon the user not answering the call, automatically transmit, via the language interpretation platform, a message to the user mobile computing device indicating one or more language interpretation connection options;

establish, via the language interpretation platform, a language interpretation session between the customer service agent computing device, a language interpreter computing device, and the user mobile computing device based on a selection by the user of the one or more language interpretation options;

store data corresponding to the one or more language interpretation options in an outbound calling data structure that automatically interjects data, prior to completion of the establishment of the language interpretation session, into a data flow of a communication that performs the establishment of the language interpretation session;

store the outbound calling data structure in a database;

generate a probabilistic model based on statistical data stored in the database, the probabilistic model establishing a probability of the user answering the call;

access, via the language interpretation platform, the outbound calling data structure and the probabilistic model;

establish, via the language interpretation platform, a second language interpretation session with the user mobile computing device responsive to the accessed outbound calling data structure stored in the database and the probabilistic model; and update the statistical data stored in the database with an answer history of the user based on an outcome of the second language interpretation session to develop the probabilistic model, the outcome including whether the user answered a call associated with the second language interpretation session.

8. The computer program product of claim 7, wherein the one or more language interpretation options comprise automatically adding contact information for the language interpretation platform to the user mobile computing device.

9. The computer program product of claim 7, wherein the one or more language interpretation options comprise data indicating a purpose of the call and a name of a customer associated with the customer service agent.

10. The computer program product of claim 7, wherein the language interpretation session is established by having the customer service agent and the language interpreter wait for the user to join the call within a predetermined time period.

11. The computer program product of claim 7, wherein the language interpretation session is established by having the customer service agent and the language interpreter initiate a new call after the call is initiated by the user.

12. The computer program product of claim 7, wherein the answer history of the user includes a dial success status and a time of establishing the second language interpretation session, and wherein the probabilistic model establishes a probability of the user answering a call by time of day.

* * * * *